United States Patent
Nayak et al.

(10) Patent No.: US 8,782,587 B2
(45) Date of Patent: Jul. 15, 2014

(54) SYSTEMS AND METHODS FOR GENERATING A HIGHER LEVEL DESCRIPTION OF A CIRCUIT DESIGN BASED ON CONNECTIVITY STRENGTHS

(71) Applicant: Atrenta, Inc., San Jose, CA (US)

(72) Inventors: Anshuman Nayak, San Jose, CA (US); Samantak Chakrabarti, Kolkata (IN); Brijesh Agrawal, Greater Noida (IN); Chandrakanti Vamshi Krishna, Warangal (IN)

(73) Assignee: Atrenta, Inc., San Jose, CA (US)

( * ) Notice: Subject to any disclaimer, the term of this patent is extended or adjusted under 35 U.S.C. 154(b) by 0 days.

(21) Appl. No.: 13/683,287

(22) Filed: Nov. 21, 2012

(65) Prior Publication Data

US 2014/0033155 A1 Jan. 30, 2014

Related U.S. Application Data

(60) Provisional application No. 61/677,334, filed on Jul. 30, 2012.

(51) Int. Cl.
*G06F 17/50* (2006.01)

(52) U.S. Cl.
USPC .......................... 716/126; 716/116

(58) Field of Classification Search
USPC .......................... 716/126–131, 116
See application file for complete search history.

(56) References Cited

U.S. PATENT DOCUMENTS

| | | | |
|---|---|---|---|
| 6,295,636 B1 | 9/2001 | Dupenloup | |
| 7,694,241 B1 | 4/2010 | Jadcherla et al. | |
| 7,925,940 B2 | 4/2011 | Pandey et al. | |
| 2003/0121019 A1* | 6/2003 | Brown et al. | 716/12 |
| 2007/0150846 A1* | 6/2007 | Furnish et al. | 716/8 |
| 2008/0091981 A1 | 4/2008 | Dokken et al. | |
| 2009/0100385 A1* | 4/2009 | Baumgartner et al. | 716/2 |
| 2009/0271750 A1 | 10/2009 | Richardson et al. | |
| 2010/0161303 A1 | 6/2010 | McGowan et al. | |
| 2010/0332172 A1 | 12/2010 | Kaufman et al. | |
| 2011/0185307 A1 | 7/2011 | Toyooka et al. | |
| 2011/0271241 A1 | 11/2011 | Krishnamoorthy et al. | |

* cited by examiner

*Primary Examiner* — Binh Tat
(74) *Attorney, Agent, or Firm* — Sughrue Mion, PLLC

(57) ABSTRACT

Provided are systems and methods for generating a higher level description of a circuit design comprising a plurality of interface instances. One or more buckets for each source instance with respect to each destination instance included in the circuit design are generated, and then the one or more buckets are sorted based on a number of bucket entries in each bucket. One or more interface instances are generated based on the sorted buckets. The higher level description of the circuit design is generated based on the one or more interface instances.

10 Claims, 11 Drawing Sheets

Buckets → Design Processed by Max Driver Pins

| Driver Instance | Destination Instance | Bucket (Connected Pin Pairs) |
|---|---|---|
| M10 | M20 | P3:R1, P4:R2, P5:R3 |
| M10 | M30 | P6:T6, P7:T7 |
| M10 | M40 | P7:V4, P8:V5 |
| M30 | M40 | T1:V1, T2:V2, T3:V3 |
| Top | M10 | X1:P1, X2:P2 |
| Top | M30 | X1:T4, X2:T5 |

FIGURE 4a

Buckets → After Sorting by Number of Bucket Entries

| Driver Instance | Destination Instance | Bucket (Connected Pin Pairs) |
|---|---|---|
| M10 | M20 | P3:R1, P4:R2, P5:R3 |
| M30 | M40 | T1:V1, T2:V2, T3:V3 |
| M10 | M30 | P6:T6, P7:T7 |
| M10 | M40 | P7:V4, P8:V5 |
| Top | M10 | X1:P1, X2:P2 |
| Top | M30 | X1:T4, X2:T5 |

FIGURE 4b

Mapping to Instances
(no Master Interface creation and no Interface Merging)

| Driver Instance | Destination Instance | Bucket (Connected Pin Pairs) | Interface Instance Created |
|---|---|---|---|
| M10 | M20 | P3:R1, P4:R2, P5:R3 | M10_M20 |
| M30 | M40 | T1:V1, T2:V2, T3:V3 | M30_M40 |
| M10 | M30 | P6:T6, P7:T7 | M10_M30 |
| M10 | M40 | P7:V4, P8:V5 | M10_M40 |
| Top | M10 | X1:P1, X2:P2 | top_M10 |
| Top | M30 | X1:T4, X2:T5 | top_M30 |

FIGURE 5

Mapping to Instances (before merging of Master Interfaces)

| Driver Instance | Destination Instance | Bucket (Connected Pin Pairs) | MASTER Interface Created | Interface Instance Created |
|---|---|---|---|---|
| M10 | M20 | P3:R1, P4:R2, P5:R3 | M1_M2 | M10_M20 |
| M30 | M40 | T1:V1, T2:V2, T3:V3 | M3_M4 | M30_M40 |
| M10 | M30 | P6:T6, P7:T7 | M1_M3 | M10_M30 |
| M10 | M40 | P7:V4, P8:V5 | M1_M4 | M10_M40 |
| Top | M10 | X1:P1, X2:P2 | top_M1 | top_M10 |
| Top | M30 | X1:T4, X2:T5 | top_M1 | top_M10 |

FIGURE 8a

Mapping to Instances (after merging of Master Interfaces)

| Driver Instance | Destination Instance | Bucket (Connected Pin Pairs) | MASTER Interface Created | Interface Instance Created |
|---|---|---|---|---|
| M10 | M20 | P3:R1, P4:R2, P5:R3 | M1_M2 | M10_M20 |
| M30 | M40 | T1:V1, T2:V2, T3:V3 | M1_M2 | M30_M40 |
| M10 | M30 | P6:T6, P7:T7 | top_M1 | M10_M30 |
| M10 | M40 | P7:V4, P8:V5 | top_M1 | M10_M40 |
| Top | M10 | X1:P1, X2:P2 | top_M1 | top_M10 |
| Top | M30 | X1:T4, X2:T5 | top_M1 | top_M10 |

SYSTEMS AND METHODS FOR GENERATING A HIGHER LEVEL DESCRIPTION OF A CIRCUIT DESIGN BASED ON CONNECTIVITY STRENGTHS

CROSS-REFERENCE TO RELATED APPLICATION

This patent application claims priority from U.S. Provisional Patent Application No. 61/677,334 filed on Jul. 30, 2012, entitled "A System and Methods for Inferring Higher Level Descriptions from RTL Topology Based on Connectivity Strengths", and which is hereby incorporated by reference in its entirety.

BACKGROUND

1. Technical Field

Systems and methods consistent with the present invention generally relate to Electronic Design Automation (EDA), and in particular to systems and methods for processing of netlists of System-on-Chip (SOC) designs relative to signal naming, signal connectivity and strengths of connectivity, properties of signals and groups of signals, and different levels of abstraction within an SOC description.

2. Description of the Related Art

System-On-Chip (SOC) designs are large and complex, frequently reaching sizes in excess of 50 million gates. As a result, when a new or enhanced application is to be addressed by a new design, the new design is most often a modification of a previous SOC design. Typically, an engineering organization attempts to use as much of the previous design as possible in order to save time, resources, and expense.

When attempting to reuse an existing SOC design, a common difficulty encountered by a design team is that the existing design may be poorly documented, or alternately simply exists only at a low register transfer level (RTL) description level with individual signal names which when viewed presents an overwhelming degree of complexity making it difficult to understand the design. Understanding the design is critical to modifying and reusing an existing design. Since creation of SOC designs typically require a team of many individuals, it is also common that at least some of the original designers are no longer available to explain an existing design—having either left the company or moved on to other projects.

SUMMARY

Therefore, one of the objectives of the present application is to introduce methods and systems for automating the generation of a higher-level description of an existing SOC design where in the higher-level description related signals are grouped together to create an abstracted description having a lower level of apparent complexity, and where a graphical representation of such a higher-level design will be much easier to understand and modify.

According to an aspect of the present invention, there is provided a method of generating a higher level description of a circuit design including a plurality of interface instances. The method includes generating one or more buckets for each source instance with respect to each destination instance included in the circuit design, sorting the one or more buckets based on a number of bucket entries in each bucket, generating one or more interface instances based on the sorted buckets, and generating the higher level description of the circuit design based on the one or more interface instances.

The generating of the one or more buckets can include processing the source instances in an order based on a maximum driver count or a maximum fanout percentage.

The bucket entries in each of the one or more buckets can include connected pin pairs between each source instance and each respective destination instance.

The method can further include generating, based on the bucket entries included in each bucket, one or more master interfaces corresponding to the one or more interface instances, and classifying the one or more master interfaces into one or more interface classes by merging the one or more master interfaces based on the number of logical ports and port types in the one or more master interfaces. The generating the higher level description of the circuit design can include the generating the higher level description based on the interface classes.

The circuit design could be an output result of reading a netlist, establishing pin-pin connectivity based on the read netlist, and performing a rule-based analysis of the established pin-pin connectivity, and/or performing an analysis based on signal connectivity propagation, to obtain signal groupings of signals included in the netlist.

Additional aspects of the present invention can be provided by way of a computer readable medium storing a program for executing functions of generating a higher level description of a circuit design including a plurality of instances, and an apparatus for generating a higher level description of a circuit design including a plurality of instances.

BRIEF DESCRIPTION OF THE DRAWINGS

The above and other features and advantages of the present invention will become more apparent by describing in detail exemplary embodiments thereof with reference to the attached drawings in which:

FIG. 4a shows an example of buckets created by the process of FIG. 2 when applied to the example of FIG. 3, according to an exemplary embodiment of the present invention;

FIG. 4b shows the buckets of FIG. 4a after sorting, according to an exemplary embodiment of the present invention;

FIG. 5 shows interfaces created based on information contained in the buckets of FIG. 4b, according to an exemplary embodiment of the present invention;

FIG. 8a shows result after the interface class creation process of FIG. 6 has been executed on the bucket list of FIG. 4b, according to an exemplary embodiment of the present invention;

FIG. 8b shows results after executing the interface class merging process of FIG. 7, according to an exemplary embodiment of the present invention.

DETAILED DESCRIPTION OF EXEMPLARY EMBODIMENTS

Figure 1:
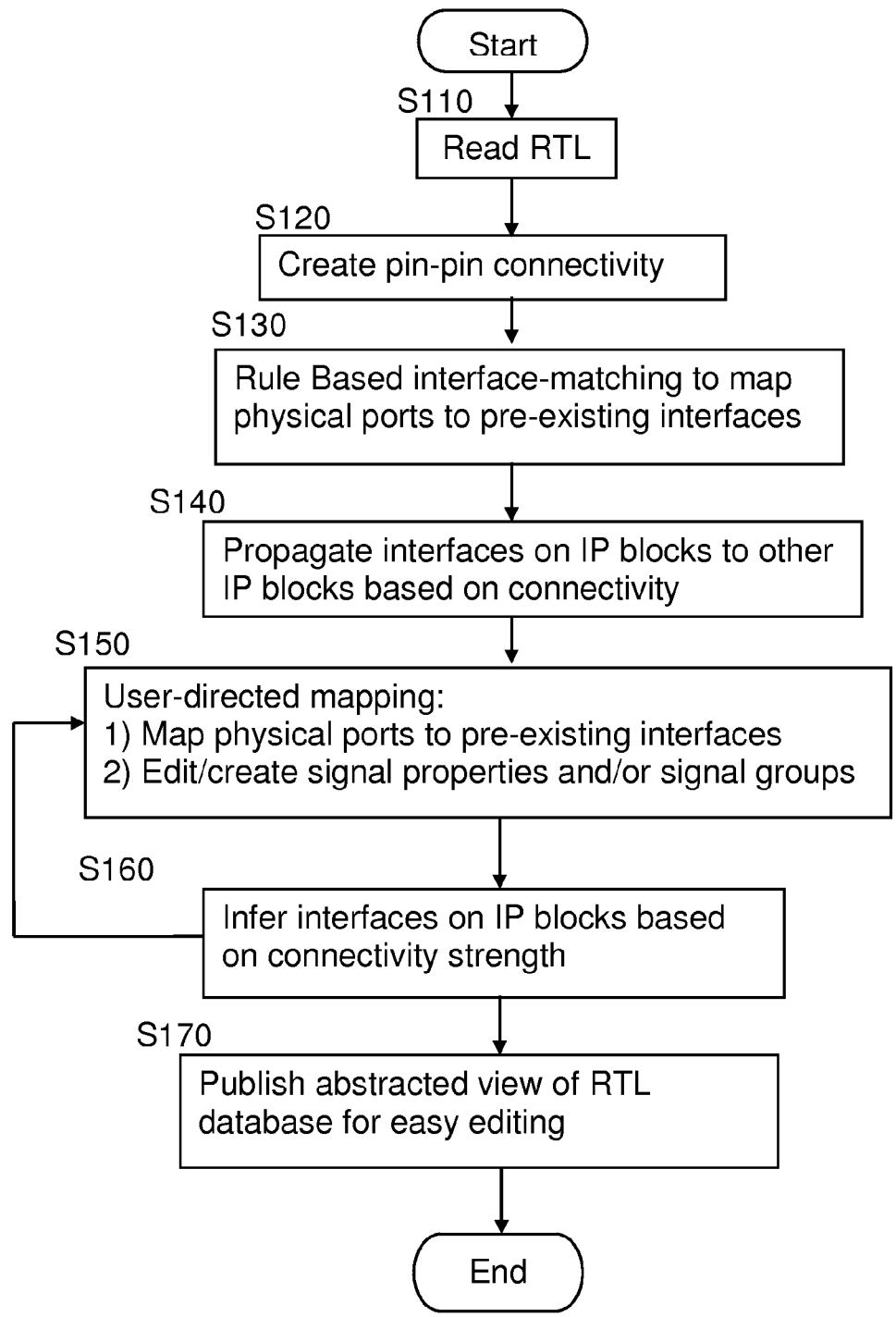
FIG. 1 shows an overview flowchart of a process where rule-based analysis, connectivity-based analysis, and connectivity strength analysis are performed on a list of signal names and signal properties to produce signal groupings that comprise a higher level description of a circuit, according to an exemplary embodiment of the present invention.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Systems and methods are disclosed for inferring higher level descriptions of circuit connectivity from register transfer level (RTL) netlists in order to provide more understandable and manageable design descriptions for complex System-on-Chip (SOC) designs. In particular, interface matching based on connectivity strength is automatically performed whereby port names and properties on instances of functional elements and blocks are assigned to top level design ports as well as other instances of functional elements and blocks to create a more robust description of connectivity according to the RTL netlist, and to automatically form signal groupings that comprise a higher-level abstracted description. Systems and methods for forming classes of logical interfaces, for instantiating logical interfaces, and for merging interfaces to form a description of minimum size are also disclosed. Further, a facility is included to allow user-guided grouping of instantiated interfaces with respect to actual signal names and properties in an RTL-level design.

Note that throughout this specification reference will be frequently be made to "IP blocks". Here "IP" refers to "Intellectual Property" however in the context of SoC design, IP block specifically refers to a functional circuit or macro circuit that may be connected to other such functional circuits as the overall SoC design is built. These IP blocks are often purchased or licensed from other companies and therefore may contain some degree of IP. Many SoC designers refer to such IP blocks or macros as simply "IPs".

An interface is defined as a collection of logical names and their characteristics or properties which are best defined together. Characteristics include signal attributes sometimes referred to as signal properties. It is possible to create a rule-based analysis and grouping process, and that will successfully group some of the signals in a netlist. However, most SOC designs comprise a wide variety of IP blocks or macros that frequently were supplied by diverse sources, and in different time periods. As such, the port names (signal names) and properties on some IP blocks may bear no resemblance to the port names and properties on other IP blocks to which they are connected.

As shown in an exemplary and non-limiting flowchart 100 of FIG. 1, a rule based grouping process (S130) may preferably be run first since it will provide some consistent groupings where the pre-existing signal names and properties allow, thus providing a starting point for signal names and properties to be propagated (S140) via netlist connectivity to IP block instances where a rule based analysis was previously less effective.

In S110 of FIG. 1, an RTL netlist is read followed by establishing pin-to-pin connectivity in S120. Choices for signal names in existing SOC designs are frequently inconsistent and/or poorly planned, and therefore the result of S130 where rule-based analysis is run may frequently not provide the most acceptable result for signal groupings, especially on the first pass. Where a rule-based analysis process is not adequate, a process of interface inference may be performed per S140 where interfaces on some IP blocks are propagated along with their properties to other blocks they connect to. Even the addition of such an interface propagation process may still not provide an adequate result. Per S150 a user may optionally make a determination as to whether the resultant signal groupings are acceptable in creating a more understandable and concise higher-level description. A user may then in S150 manually specify partial signal groupings or signal properties, or manually map a port to a pre-existing interface.

Since SOC designs employ significant re-use of IP blocks and those IP blocks may come from highly diverse sources, it frequently occurs that the information is not present for either rule-based or propagation based methods per S130 and S140 to provide a representation that is adequately simplified. The connections in the design that present the challenge may have no defined interfaces and signal naming may be inconsistent, incomprehensible, or even absent.

In S160, an automatic process infers interfaces based on connectivity strength as described herein. A first instance is more strongly connected to a second instance when a larger number of nets connect them than are used to connect the first instance to other instances. Once the user is content that the resultant high level design representation is adequate, they can publish S170 the resultant abstracted view of the RTL database for easier review and editing.

IP Block Interface Definitions—Signal Names and Properties

In general, a standard or preexisting interface definition may include for each logical port one or more of the following attributes/properties which represent a non-limiting, exemplary list: LogicalPortName; Direction; MSB; LSB; sig_type; default; registered; optional; and requiresDriver. The attributes/properties listed above could be defined as follows:

LogicalPortName—the signal name at a port on an IP block instance;

Direction—signal direction: input; output; or bidirectional;

MSB—Most Significant Bit of a bus;

LSB—Least Significant Bit of a bus;

sig_type—signal type as in clk, data, etc.;

default—a signal with a default characteristic that may be changed by a user;

registered—the output of a flip-flop, latch, or register;

optional—a signal that is optionally included at the discretion of the user;

requiresDriver—a signal that must be driven such as a clk pin or clk enable.

As described herein, a user can create some complex groupings based on interface names. In addition to pre-existing and standard interfaces that may be supplied, such as but not limited to an ARM interface, a user can create more custom interfaces with custom names to allow the grouping of signals as a result of signal and property name propagation via traversal of a netlist connectivity. ARM interfaces relate to embedded processor IP blocks supplied by ARM® Ltd, and are well known in the art.

A user can also create logical classes of interfaces containing groups of logical pins and port types, and then instantiate these logical interface classes to create higher level representations that are not only simpler, but also more organized, hierarchical, and regular. For instance, a logical interface of the type "MASTER" may be created and instantiated to specific interfaces along with its counterpart "MIRRORED MASTER". A logical interface of the type or class of MASTER frequently includes an interface that is characterized by driver functionality as in the case of a bus master. A logical interface of the type or class of MIRRORED MASTER would include interfaces that are on the receiving end of signals driven by an interface of the type MASTER. For instance if a MASTER interface includes clock drivers, then a corresponding MIRRORED MASTER interface would include clock pins. If a MASTER interface includes data bus drivers, then a corresponding MIRRORED MASTER interface would include data bus input pins.

Inference by Connectivity Strength

Figure 2:
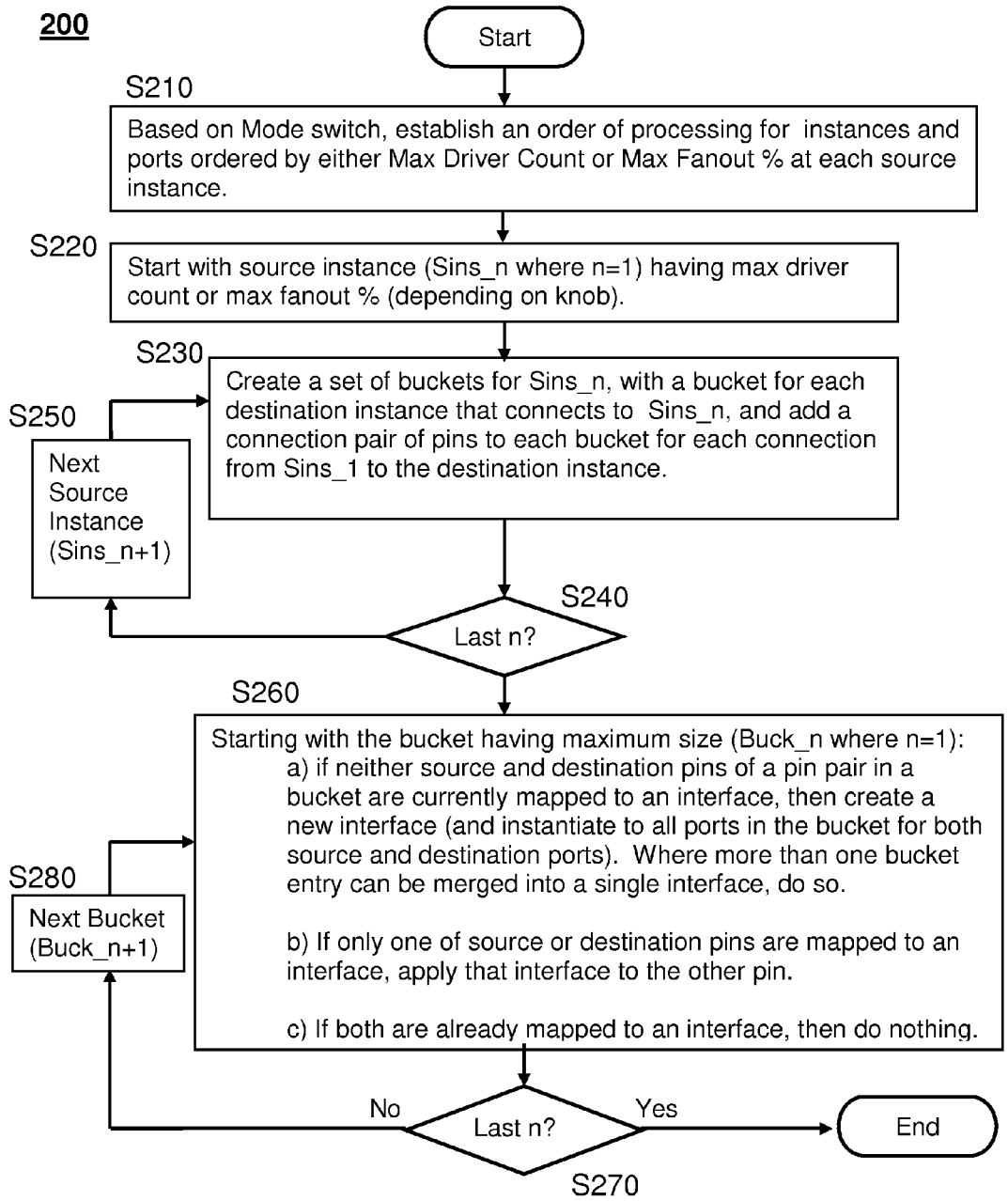
FIG. 2 shows a flowchart for a process that analyzes signal names and properties in a netlist according to connectivity strength in order to facilitate grouping of signals, according to an exemplary embodiment of the present invention.

A generalized view of the interface inference process of S160 is shown in an exemplary and non-limiting flowchart 200 of FIG. 2. The process of FIG. 2 is typically performed "top-down"—i.e. it starts from top level design objects and ends on leaf-level subsystems. Alternately, the process may be performed for the top level design only.

First, per S210, a decision is made whether to process instances in the design according to Maximum Driver Count, or according to Maximum Fanout Percentage. A software switch is typically used to specify how the order of processing instances is determined. For processing according to Maximum Fanout Percentage, instances are processed in decreasing order of the fanout factor which is the percentage of driver ports on an instance with respect to total number of ports. For processing in order according to Maximum Driver Count, the absolute number of driver ports on an instance is used to rank the instances and the instance with the largest number of driver ports is processed first.

Per S220, source instances are processed starting with the instance having Maximum Driver Count or Maximum Fanout Percentage. Then, per S230 a set of buckets is created for each source instance, with a bucket for each destination instance that connects to the source instance. A connection pair of pins is then added to each bucket for each connection from the source instance to the destination instance. The process then continues according to S240 whereby the next source instance is processed S250 in descending order of either Max Driver Count or Max Fanout Percentage. An exemplary and non-limiting result of this process through S250 is shown in FIG. 4A for the example circuit shown in FIG. 3.

For subsequent processing, the buckets shown in the table of FIG. 4A are sorted by the number of pin pair bucket entries producing the table of FIG. 4B. The sorted bucket list is then processed per S260 in FIG. 2. Here, each pin pair in a bucket is evaluated and if neither source nor destination pins are currently mapped to an interface, then a new interface is created and then instantiated to all ports in the bucket for both source and destination ports. Also, where more than one bucket entry can be merged into a single interface, this is also done. To merge multiple bucket entries into the single interface, the respective pin types for each must match. Interfaces are a collection of logical ports and logical ports get their types from the physical port they map to. So to merge interfaces, it is necessary to ensure that only those interfaces are merged where the logical port types are same.

If however as shown for S260, only one of the source or destination pins in a pin pair are already mapped to an interface, then that interface is applied to the other pin of the pin pair. If neither source nor destination pin of a pin pair is already mapped to an interface, then no further processing of that pin pair is required. If per S270, the bucket just processed was the last bucket in the previously established processing order, then the bucket processing sequence is complete. If not, then per S280 the next bucket in the previously established processing sequence is then processed.

Figure 3:
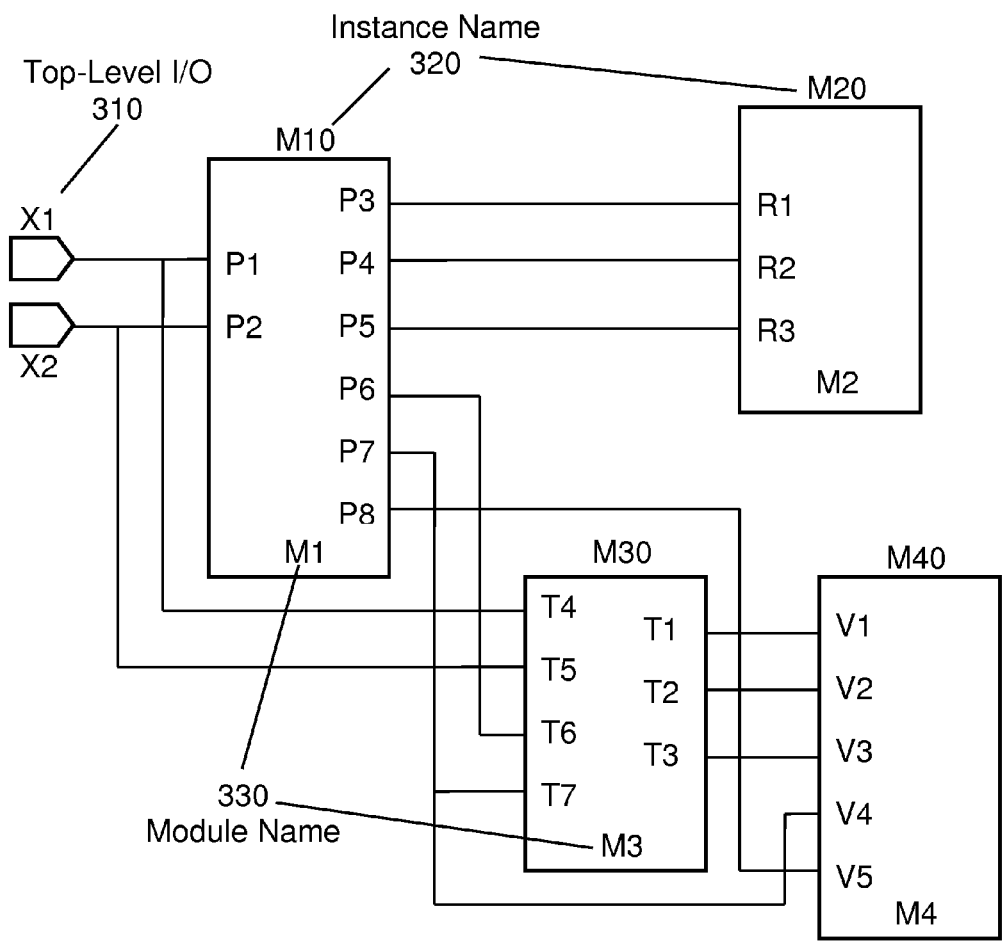
FIG. 3 shows an exemplary circuit schematic diagram used to describe an exemplary embodiment of the present invention.

The exemplary and non-limiting circuit 300 of FIG. 3 will be used as an example to explain the operation of the invention. This example involves top-level chip I/O pins 310 named X1 and X2, as well as four IP block instances M10, M20, M30, and M40. The instance name 320 for these instances is shown just above the instance, and the module name 330 is shown within each module at the bottom. For processing this circuit for this example only, the order of processing has been chosen to be according to Max Driver Count.

An RTL description for the exemplary and non-limiting circuit of FIG. 3 is shown here:

```
module M1(P1,P2,P3,P4,P5,P6,P7,P8);
input P1,P2;
output P3,P4,P5,P6,P7,P8;
endmodule
module M2(R1,R2,R3);
input R1,R2,R3;
endmodule
module M3(T1,T2,T3,T4,T5,T6,T7);
output T1,T2,T3;
input T4,T5,T6,T7;
endmodule
module M4(V1,V2,V3,V4,V5);
input V1,V2,V3,V4,V5;
endmodule
module top(X1,X2);
input X1,X2;
wire a,b,c,d,e,f,g,h,i;
M1 M10(
    .P1(X1),
    .P2(X2),
    .P3(a),
    .P4(b),
    .P5(c),
    .P6(d),
    .P7(e),
    .P8(f)
);
M2 M20 (
    .R1(a),
    .R2(b),
    .R3(c)
);
M3 M30(
    .T1(g),
    .T2(h),
    .T3(i),
    .T4(X1),
    .T5(X2),
    .T6(d),
    .T7(e)
);
M4 M40(
    .V1(g),
    .V2(h),
    .V3(i),
    .V4(e),
    .V5(f)
);
endmodule
```

As indicated earlier, the table of FIG. 4A shows the buckets that resulted from the process according to FIG. 2, when applied to the design of FIG. 3. Driver instance M10 possessed the maximum driver pin count of all instances being processed, and thus was processed first and appears first in the table. Driver instance Top was processed last since it possessed the minimum number of driver pins from among the instances being processed, and thus appears at the bottom of the table. For each driver instance, a destination instance is shown along with associated connection pin pairs. Per S260, buckets are processed according to the bucket having maximum size and hence the buckets are sorted producing the result shown in the table of FIG. 4B.

The results of processing the subject example according to the exemplary process of FIG. 2, and with no interface merging being performed, is shown in the table of FIG. 5. Here, each of the six buckets produces an interface instance. As such, a design modified per FIG. 5 would show a circuit diagram where the eleven separate wires of the original diagram of FIG. 3 would now be represented by six wires, thus reducing the overall complexity of the design significantly. While such a transformation would certainly improve (reduce) the apparent complexity of the design, it does not establish a top-down hierarchy including interfaces classes and instantiations that a designer would have created were the SOC design being created anew.

Figure 6:
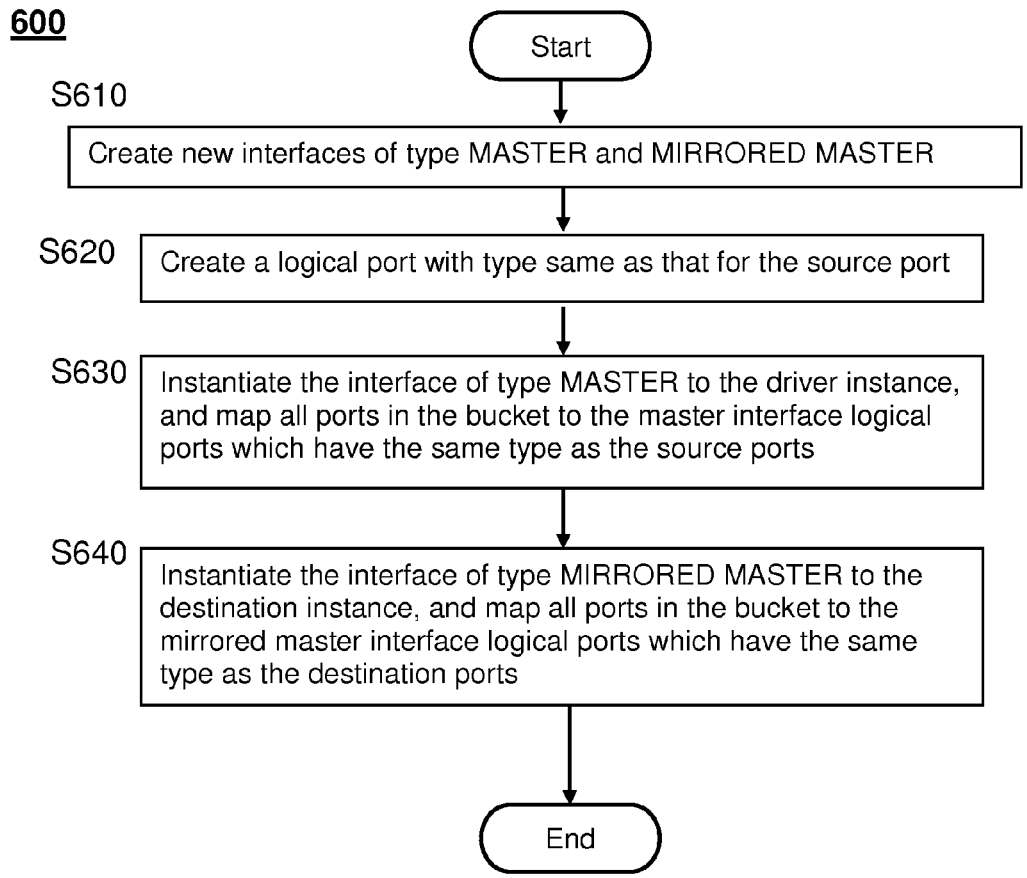
FIG. 6 shows a process whereby MASTER and MIRRORED MASTER interface classes are created, according to an exemplary embodiment of the present invention.

Therefore, it is further useful to create logical interface classes as described for example by flowchart 600 of FIG. 6, and instantiate those interfaces with respect to the connection groupings that have been established per the bucket list tables of FIGS. 4A and 4B. To accomplish this, new interfaces of type MASTER and MIRRORED MASTER are first created per S610. Then in S620, a logical port is created with the same type as that of the source port. Next per S630, the interface type of MASTER is instantiated to the driver instance, and all ports in the bucket are mapped to the master interface logical ports which have the same type as the source ports. Last, per S640 the interface of type MIRRORED MASTER is instantiated to the destination instance, and all ports in the bucket are mapped to the MIRRORED MASTER interface logical ports which have the same type as the destination ports.

Beyond this mapping, it is frequently possible to merge logical classes of interfaces to reduce the number of interface classes which are required to represent the design. This results in a cleaner, simpler, and more hierarchical design, and in some cases will further result in reducing the number of interface instantiations in the final representation. For the example shown here, five interfaces are instantiated prior to interface class merging, and five remain after merging. However, the number of interface classes is reduced from five to two as a result of the interface merging process described for example in flowchart 700 of FIG. 7. After the simple merging of interface instances described in S260, and after creating interfaces classes per FIG. 6, the list of interface classes and instantiated interfaces of the example design of FIG. 3 will appear as follows.

Pre-Merge Interface Inference Results

The interface classes which were inferred prior to merging interface classes are the following, including logical pins created and port types:

top_M1
    When instantiated with mode=MASTER

| Logical Port: L_X1 | INPUT |
| Logical Port: L_X2 | INPUT |

When instantiated with mode=MIRRORED-MASTER

| Logical Port: L_X1 | OUTPUT |
| Logical Port: L_X2 | OUTPUT |

M1_M2
    When instantiated with mode=MASTER

| Logical Port: L_P3 | INPUT |
| Logical Port: L_P4 | INPUT |
| Logical Port: L_P5 | INPUT |

When instantiated with mode=MIRRORED-MASTER

| Logical Port: L_P3 | OUTPUT |
| Logical Port: L_P4 | OUTPUT |
| Logical Port: L_P5 | OUTPUT |

M1_M3
    When instantiated with mode=MASTER

| Logical Port: L_P6 | INPUT |
| Logical Port: L_P7 | INPUT |

When instantiated with mode=MIRRORED-MASTER

| Logical Port: L_P6 | OUTPUT |
| Logical Port: L_P7 | OUTPUT |

M1_M4
    When instantiated with mode=MASTER

| Logical Port: L_P7 | INPUT |
| Logical Port: L_P8 | INPUT |

When instantiated with mode=MIRRORED-MASTER

| Logical Port: L_P7 | OUTPUT |
| Logical Port: L_P8 | OUTPUT |

M3_M4
    When instantiated with mode=MASTER

| Logical Port: L_T1 | INPUT |
| Logical Port: L_T2 | INPUT |
| Logical Port: L_T3 | INPUT |

When instantiated with mode=MIRRORED-MASTER

| Logical Port: L_T1 | OUTPUT |
| Logical Port: L_T2 | OUTPUT |
| Logical Port: L_T3 | OUTPUT |

Interface instances on component M10:
top_M10→instantiation of interface "top_M1" with mode="MASTER"

Pin Mapping (on M10): L_X1→P1, L_X2→P2
M10_M20→instantiation of interface "M1_M2" with mode="MIRRORED-MASTER"
Pin Mapping (on M10): L_P3→P3, L_P4→P4, L_P5→P5
M10_M30→instantiation of interface "M1_M3" with mode="MIRRORED-MASTER"
Pin Mapping (on M10): L_P6→P6, L_P7→P7
M10_M40→instantiation of interface "M1_M4" with mode="MIRRORED-MASTER"
Pin Mapping (on M10): L_P7→P7, L_P8→P8
Interface instances on component M20:
M10_M20→instantiation of interface "M1_M2" with mode="MASTER"
Pin Mapping (on M20): L_P3→R1, L_P4→R2, L_P5→R3
Interface instances on component M30:
top_M10→instantiation of interface "top_M1" with mode="MASTER"
Pin Mapping (on M30): L_X1→T4, L_X2→T5
M10_M30→instantiation of interface "M1_M3" with mode="MASTER"
Pin Mapping (on M30): L_P6→T6, L_P7→T7
M30_M40→instantiation of interface "M3_M4" with mode="MIRRORED-MASTER"
Pin Mapping (on M30): L_T1→T1, L_T2→T2, L_T3→T3
Interface instances on component M40:
M10_M40→instantiation of interface "M1_M4" with mode="MASTER"
Pin Mapping (on M40): L_P7→V4, L_P8→V5
M30_M40→instantiation of interface "M3_M4" with mode="MASTER"
Pin Mapping (on M40): L_T1→V1, L_T2→V2, L_T3→V3
Interface instances on component top:
top_M10→instantiation of interface "top_M1" with mode="MASTER"
Pin Mapping (on top): L_X1→X1, L_X2→X2

A representation of a bucket list table for the design prior to interface class merging is shown in table 8a where five interface classes have been created.

Figure 7:
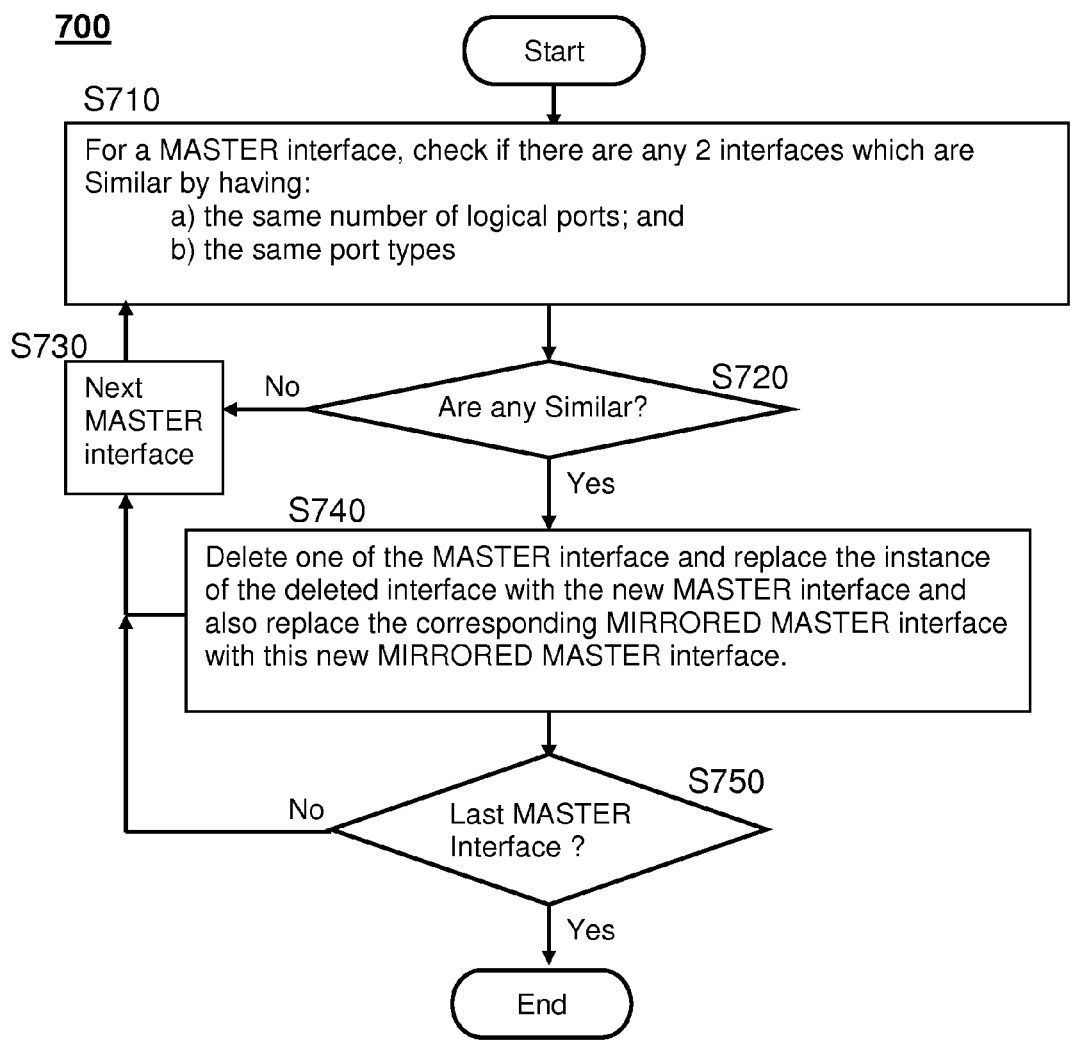
FIG. 7 shows a process whereby MASTER and MIRRORED MASTER interface classes are merged, according to an exemplary embodiment of the present invention.

The process of merging interface classes is described in FIG. 7. Per S710, for a first MASTER interface, it is determined if there are any two interfaces which are similar, where similar is defined as having the same number of logical ports and the same port types. If none are similar per S720, the next MASTER interface is examined per S730 and S710. If per S720 there are similar interfaces for the MASTER interface being examined, then the process proceeds to S740 where one of the master interfaces is deleted and the instance is replaced with the new master interface. The corresponding MIRRORED MASTER interface is also replaced with a new MIRRORED MASTER interface. Per S750, the process determines whether there are any more master interfaces to examine, and if so, the next Master interface is examined per S730 and S710.

A representation of a bucket list table for the design after interface class merging is shown in table 8b where there are now only two interface classes, thus simplifying the overall SOC representation.

Post-Merge Interface Inference Results

The interface classes which were inferred after merging interface classes are the following, including logical pins created and port types:

top_M1
When instantiated with mode=MASTER

| | |
|---|---|
| Logical Port: L_X1 | INPUT |
| Logical Port: L_X2 | INPUT |

When instantiated with mode=MIRRORED-MASTER

| | |
|---|---|
| Logical Port: L_X1 | OUTPUT |
| Logical Port: L_X2 | OUTPUT |

M1_M2
When instantiated with mode=MASTER

| | |
|---|---|
| Logical Port: L_P3 | INPUT |
| Logical Port: L_P4 | INPUT |
| Logical Port: L_P5 | INPUT |

When instantiated with mode=MIRRORED-MASTER

| | |
|---|---|
| Logical Port: L_P3 | OUTPUT |
| Logical Port: L_P4 | OUTPUT |
| Logical Port: L_P5 | OUTPUT |

Interface instances on component M10:
top_M10→instantiation of interface "top_M1" with mode="MASTER"
Pin Mapping (on M10): L_X1→P1, L_X2→P2
M10_M20 instantiation of interface "M1_M2" with mode="MIRRORED-MASTER"
Pin Mapping (on M10): L_P3→P3, L_P4→P4, L_P5→P5
M10_M30→instantiation of interface "top_M1" with mode="MIRRORED-MASTER"
Pin Mapping (on M10): L_X1→P6, L_X2→P7
M10_M40→instantiation of interface "top_M1" with mode="MIRRORED-MASTER"
Pin Mapping (on M10): L_X1→P7, L_X2→P8
Interface instances on component M20:
M10_M20→instantiation of interface "M1_M2" with mode="MASTER"
Pin Mapping (on M20): L_P3→R1, L_P4→R2, L_P5→R3
Interface instances on component M30:
top_M10→instantiation of interface "top_M1" with mode="MASTER"
Pin Mapping (on M30): L_X1→T4, L_X2→T5
M10_M30→instantiation of interface "top_M1" with mode="MASTER"
Pin Mapping (on M30): L_X1→T6, L_X2→T7
M30_M40→instantiation of interface "M1_M2" with mode="MIRRORED-MASTER"
Pin Mapping (on M30): L_P3→T1, L_P4→T2, L_P5→T3
Interface instances on component M40:
M10_M40→instantiation of interface "top_M1" with mode="MASTER"
Pin Mapping (on M40): L_X1→V4, L_X2→V5
M30_M40→instantiation of interface "M1_M2" with mode="MASTER"
Pin Mapping (on M40): L_X1→V1, L_X2→V2, L_P5→V3

Interface instances on component top:
top_M10→instantiation of interface "top_M1" with mode="MASTER"
Pin Mapping (on top): L_X1→X1, L_X2→X2

Figure 9:
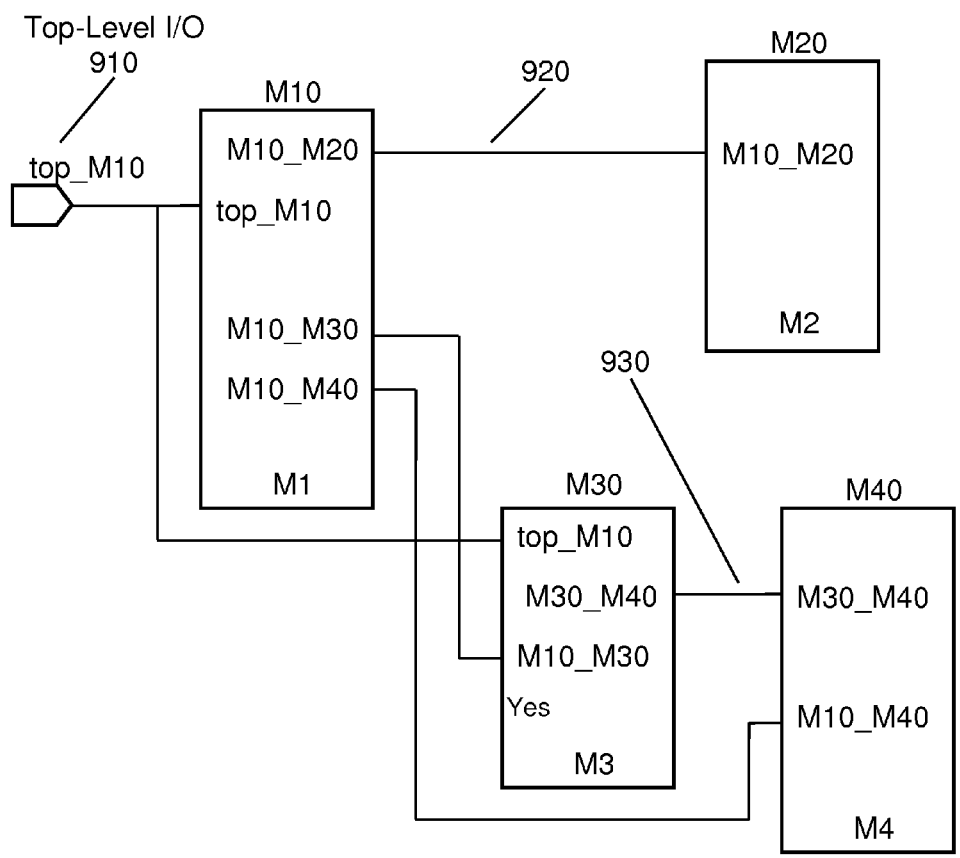
FIG. 9 shows a circuit diagram after interface inference per the invention including interface class creation and interface class merging, according to an exemplary embodiment of the present invention.

A graphical representation for the design of FIG. 3 after interface inference per the process described herein including interface class merging is shown in exemplary schematic diagram 900 of FIG. 9. Note that there is now only one Top-Level port 910. Wire 920 has replaced three wires in the original schematic of FIG. 3. Wire 930 has also replaced three wires in the original schematic. Overall, the resultant SOC design has been greatly simplified for reviewing and editing.

User-Directed Mapping

Direct Mapping or User-Directed Mapping enables a user to make incremental changes to one or more signal groupings or signal properties. A user can add more signals to a grouping or delete some signals from a grouping. A user may manually map a port on an IP block instance to a pre-existing interface. Accordingly, any user-made changes to a grouping are maintained to ensure that any subsequent automated incremental changes use that grouping or partial grouping as a starting point. Subsequently, the results of the propagation and grouping processes describer herein will improve incrementally, adding signal names to improve a grouping based on the starting point supplied by the user. Alternately, more groups based on iteratively run automated propagation may be created.

Figure 10:
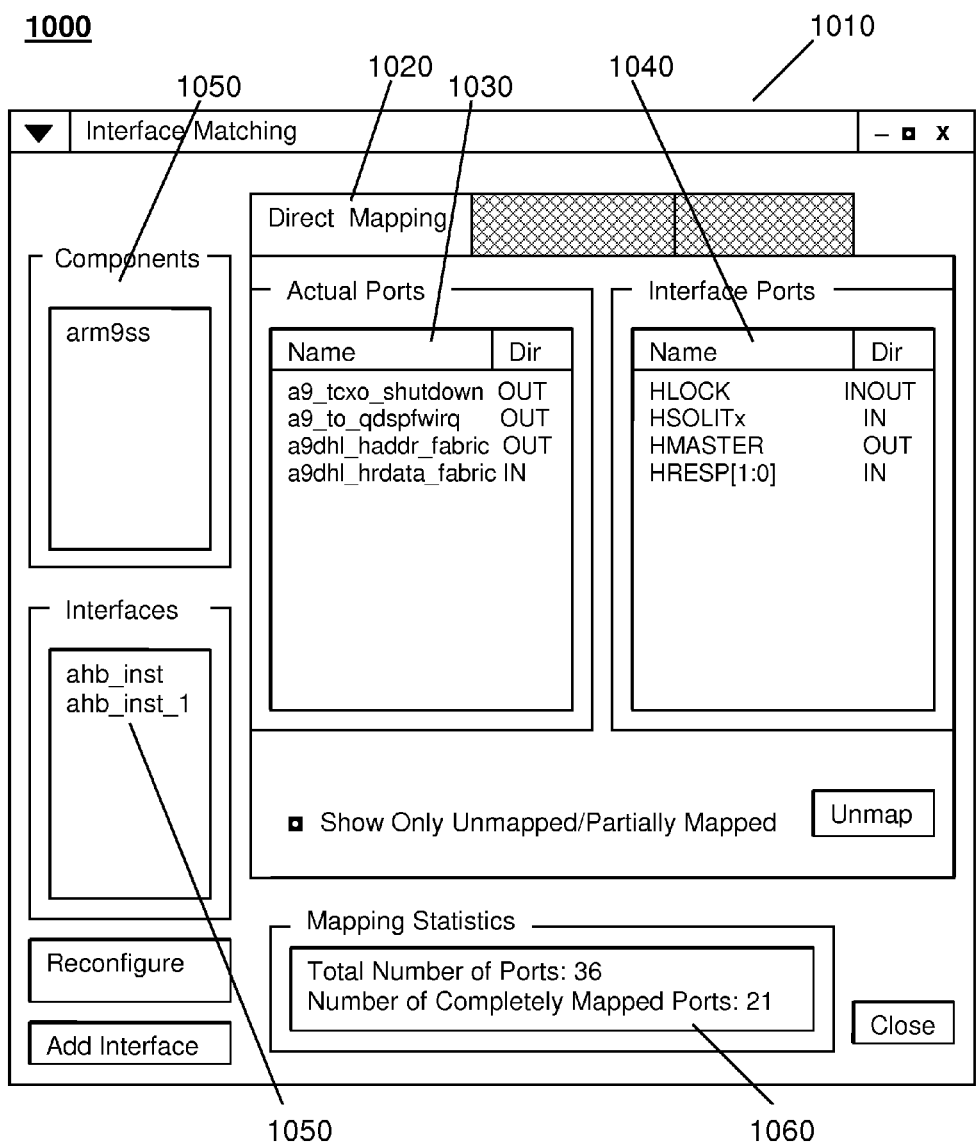
FIG. 10 shows an example of a user interface in which a user manually maps signal groups and signal properties to interfaces, according to an exemplary embodiment of the present invention.

FIG. 10 shows an exemplary and non-limiting User Interface (UI) 1000 for controlling operation according to the invention with respect to user-directed mapping. User interface window 1010 is shown with the Direct Mapping tab 1020 selected. The direct mapping tab provides a list of actual ports 1030 in the RTL level netlist as well as a list 1040 of logical interface ports which the software will eventually associate with groups of signal names and properties from list 1030. Using the interface of window 1010, the user may associate specific port names 1030 with an interface name 1040 to create a partial grouping of signal names. They may also add or modify signal properties, thus providing additional pre-existing information to be used in further automated propagation of signal properties and groups using hierarchy traversal. Pre-existing interfaces 1050 are shown as well as mapping statistics 1060.

EDA System and Software

Figure 11:
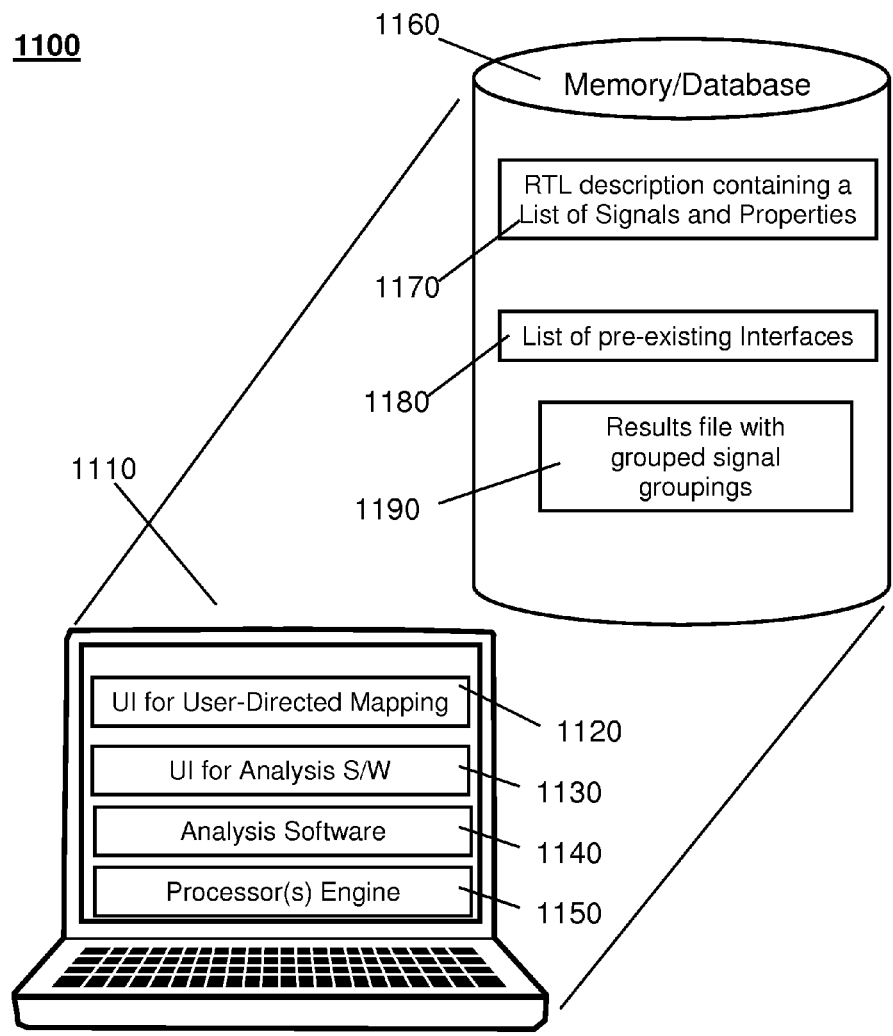
FIG. 11 shows a block diagram of a system according to an exemplary embodiment of the present invention.

In a non-limiting embodiment of the present invention, the operation requires a system 1100 including a computer platform 1110 of some kind. Such a platform may include a dedicated workstation, a central computer operated from a remote terminal, or one or more computing resources located on the Internet including resources of the type now known as the "Cloud", and the likes. An exemplary and non-limiting embodiment of a dedicated computer aided design (CAD) or EDA system 1100 is shown in FIG. 11. Here, a workstation 1110 operates a UI 1120 for providing direct mapping of signal names and groups, UI 1130 for operating a software program 1140 to automatically propagate signal names and properties according to hierarchy traversal and for automatically grouping signals. Analysis software program 1140 contains a series of instructions that are executed on one or more processors comprising engine 1150 upon which software for workstation 1110 operates.

A memory and database resource 1160 for workstation 1110 is also shown in FIG. 11. The memory and database resource 1160 may be located physically within workstation 1110 or alternately be external to workstation 1110. Memory and database resource 1160 contains an RTL description 1170 containing a list of signal names and properties which a user may wish to propagate and/or group, a list of pre-existing interfaces 1180, and a results file 1190 containing signal names and properties which have been grouped.

At least certain principles of the invention can be implemented as hardware, firmware, software or any combination thereof. Moreover, the software is preferably implemented as an application program tangibly embodied on a program storage unit, a non-transitory user machine readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a user machine platform having hardware such as one or more central processing units ("CPUs"), a memory, and input/output interfaces. The user machine platform may also include an operating system and microinstruction code. The various processes and functions described herein may be either part of the microinstruction code or part of the application program, or any combination thereof, which may be executed by a CPU, whether or not such user machine or processor is explicitly shown. In addition, various other peripheral units may be connected to the user machine platform such as an additional data storage unit and a printing unit.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A computerized method for analyzing a circuit description netlist to produce a higher level description, comprising:
   receiving a netlist including block instances that comprises at least a portion of a circuit description netlist;
   analyzing by one or more processors the netlist including grouping ports according to connectivity strength between a source instance and at least one connected destination instance;
   creating a list of bucket entries containing driver instance names, destination instance names and connected pairs of ports corresponding to specific driver port instances and destination port instances;
   assigning signal groupings corresponding to groups of connected ports to higher-level interface definitions; and
   saving, in memory, the higher level interface definitions and related signal groupings and signal properties,
   wherein for each bucket list entry, the method further comprises:
   creating new interfaces of types MASTER and MIRRORED MASTER;
   creating a logical port of a same type as that of a driver port instance;
   instantiating an interface of type MASTER to the driver port instance, and mapping all ports in the bucket list entry to master interface logical ports which have the same type as the driver port; and
   instantiating an interface of type MIRRORED MASTER to each destination instance, and mapping all ports in the bucket to mirrored master interface logical ports which have the same type as ports on the destination instance.

2. The computerized method of claim 1, further comprising:
   receiving an indication regarding the acceptability of the signal groupings;

receiving at least one manually specified signal property or signal grouping for the signal groupings that are not yet acceptable; and analyzing by the one or more processors the netlist including grouping signals according to connectivity strength between a source instance and at least one connected destination instance, while maintaining the at least one manually specified signal property or signal grouping.

3. The computerized method of claim 2, wherein a user interface is provided to facilitate the manually specifying of the at least one signal property or signal grouping by a user.

4. The computerized method of claim 1, wherein to produce the list of bucket entries, the netlist is processed in order of either driver count or fanout percentage starting with the maximum driver count or maximum fanout percentage, respectively.

5. The computerized method of claim 1, wherein the list of bucket entries is sorted by bucket size prior to further processing.

6. The computerized method of claim 1, wherein for source and destination ports of a pair of ports in a bucket where both ports are not currently mapped to an interface, the method further comprises:

creating a new interface and instantiating the new interface to all ports in the bucket for both source and destination ports.

7. The computerized method of claim 1, wherein for source and destination ports of a pair of ports in a bucket where only one port is mapped to an interface, the method further comprises:

applying that interface to the other port of the pair of ports.

8. The computerized method of claim 1, wherein for source and destination ports of a pair of ports in a bucket where both ports are already mapped to an interface, the method further comprising:

proceeding to the next entry in the bucket list.

9. The computerized method of claim 1, wherein when more than one entry in the bucket list can be merged into a single interface, merging a plurality of entries into the single interface.

10. A computerized method for analyzing a circuit description netlist to produce a higher level description, comprising:

receiving a netlist including block instances that comprises at least a portion of a circuit description netlist;

analyzing by one or more processors the netlist including grouping ports according to connectivity strength between a source instance and at least one connected destination instance;

creating a list of bucket entries containing driver instance names, destination instance names and connected pairs of ports corresponding to specific driver port instances and destination port instances;

assigning signal groupings corresponding to groups of connected ports to higher-level interface definitions; and saving, in memory, the higher level interface definitions and related signal groupings and signal properties, wherein for source and destination ports of a pair of ports in a bucket where both ports are already mapped to an interface, the method further comprises:

proceeding to the next entry in the bucket list, wherein for each MASTER interface, the method further comprises:

determining that there is another MASTER interface with the same number of logical ports and the same port types; and for each pair of MASTER interfaces with the same number of logical ports and the same port types, deleting a MASTER interface and replacing the instance of the deleted interface with a new MASTER interface; and replacing a MIRRORED MASTER interface corresponding to the deleted master interface with a corresponding new MIRRORED MASTER interface.

* * * * *